(12) United States Patent
Holland et al.

(10) Patent No.: US 11,445,733 B2
(45) Date of Patent: Sep. 20, 2022

(54) APPARATUS AND METHOD FOR TREATMENT AND INSPECTION OF PRODUCE

(71) Applicant: Apeel Technology, Inc., Goleta, CA (US)

(72) Inventors: Chance Holland, Goleta, CA (US); Claire Patterson, Santa Barbara, CA (US); Louis Van Blarigan, Truckee, CA (US); Edwin William Spurling, Goleta, CA (US); Matthew Taylor Aronson, Mebane, NC (US); Matthew Dominick Gaudioso, Santa Barbara, CA (US)

(73) Assignee: Apeel Technology, Inc., Goleta, CA (US)

( * ) Notice: Subject to any disclaimer, the term of this patent is extended or adjusted under 35 U.S.C. 154(b) by 300 days.

(21) Appl. No.: 16/635,518

(22) PCT Filed: Jul. 31, 2018

(86) PCT No.: PCT/US2018/044633
§ 371 (c)(1),
(2) Date: Jan. 30, 2020

(87) PCT Pub. No.: WO2019/028043
PCT Pub. Date: Feb. 7, 2019

(65) Prior Publication Data
US 2020/0253228 A1     Aug. 13, 2020

Related U.S. Application Data

(60) Provisional application No. 62/539,152, filed on Jul. 31, 2017.

(51) Int. Cl.
*B65G 39/20*     (2006.01)
*B65G 17/24*     (2006.01)
(Continued)

(52) U.S. Cl.
CPC ................. *A23B 7/16* (2013.01); *A23B 7/02* (2013.01); *A23L 3/001* (2013.01); *A23N 12/005* (2013.01);
(Continued)

(58) Field of Classification Search
None
See application file for complete search history.

(56) References Cited

U.S. PATENT DOCUMENTS 2,033,044 A     3/1936   McDill et al.
3,407,678 A *  10/1968  Steinke .................. F16H 27/04
                                                              475/182

(Continued)

FOREIGN PATENT DOCUMENTS

CN         2555640        6/2003
CN        201595155      10/2010
(Continued)

OTHER PUBLICATIONS

PCT International Preliminary Report on Patentability in International Appln. No. PCT/US2018/044633, dated Feb. 13, 2020, 15 pages.

(Continued)

*Primary Examiner* — Kavel Singh
(74) *Attorney, Agent, or Firm* — Fish & Richardson P.C.

(57) ABSTRACT

Described herein are conveyor systems and application units which can be used to transport and simultaneously treat, or to facilitate treatment and inspection of produce, agricultural products, or other items. The conveyor systems and application units can be configured to allow products to be simultaneously rotated as they are moved along a packing line, which can facilitate the uniform application of spray coatings and/or allow the products to be uniformly blow dried while they are moved. Exemplary conveyor systems (Continued)

and application units can include a bed formed of a plurality of rollers and a rotation inducing device that causes the rollers to rotate while they are laterally transported, thereby causing the products lying on top of the bed to rotate during transport.

20 Claims, 9 Drawing Sheets

(51) Int. Cl.

| | | |
|---|---|---|
| *B65G 13/07* | (2006.01) | |
| *A23B 7/16* | (2006.01) | |
| *A23B 7/02* | (2006.01) | |
| *A23L 3/00* | (2006.01) | |
| *A23N 12/00* | (2006.01) | |
| *A23N 15/06* | (2006.01) | |
| *A23N 12/08* | (2006.01) | |

(52) U.S. Cl.
CPC ............ *A23N 12/08* (2013.01); *A23N 15/06* (2013.01); *B65G 13/07* (2013.01); *B65G 17/24* (2013.01); *B65G 39/20* (2013.01); *A23V 2002/00* (2013.01)

(56) References Cited

U.S. PATENT DOCUMENTS

| | | | |
|---|---|---|---|
| 3,488,200 A | 1/1970 | Glasgow et al. | |
| 3,715,024 A | 2/1973 | Mumma | |
| 4,262,794 A * | 4/1981 | Bourgeois | B65G 17/24 198/779 |
| 4,331,691 A * | 5/1982 | Poovaiah | A23B 7/158 426/321 |
| 4,331,693 A * | 5/1982 | Wojciechowski | A23B 7/152 422/4 |
| 4,726,898 A | 2/1988 | Mills et al. | |
| 5,101,763 A | 4/1992 | Creason et al. | |
| 5,727,711 A | 3/1998 | Emond et al. | |
| 6,004,604 A | 12/1999 | Thomas, Jr. et al. | |
| 6,148,989 A | 11/2000 | Ecker | |
| 6,409,041 B1 | 6/2002 | Overholt et al. | |
| 8,445,045 B2 | 5/2013 | Goetz | |
| 8,904,952 B2 | 12/2014 | Sardo et al. | |
| 9,475,643 B1 | 10/2016 | Odman et al. | |
| 2006/0037892 A1 | 2/2006 | Blanc | |
| 2007/0237893 A1 | 10/2007 | Moore et al. | |
| 2009/0242579 A1 | 10/2009 | Huang | |
| 2011/0259263 A1 | 10/2011 | Sardo et al. | |
| 2012/0269941 A1 | 10/2012 | Goetz | |
| 2015/0321832 A1 | 11/2015 | Bankowski | |
| 2017/0073532 A1 | 3/2017 | Perez et al. | |
| 2021/0163217 A1 | 6/2021 | Perez et al. | |
| 2021/0289801 A1 | 9/2021 | Hegel et al. | |

FOREIGN PATENT DOCUMENTS

| | | |
|---|---|---|
| CN | 101897464 | 12/2010 |
| CN | 207040847 | 2/2018 |
| DE | 3622191 | 1/1988 |
| DE | 29912621 | 12/1999 |
| EP | 1854360 | 11/2007 |
| ES | 1041955 | 8/1999 |
| GB | 2339766 | 2/2000 |
| WO | 2010031929 | 3/2010 |
| WO | WO 2014085845 | 6/2014 |
| WO | WO 2017172951 | 10/2017 |
| WO | WO 2019028043 | 2/2019 |

OTHER PUBLICATIONS

PCT International Search Report and Written Opinion in International Appln. No. PCT/US2018/044633, dated Nov. 19, 2018, 24 pages.
PCT International Search Report and Written Opinion in International Appln. No. PCT/US2019/042693, dated Oct. 2, 2019, 8 pages.
PCT International Search Report and Written Opinion in International Appln. No. PCT/US2019/045784, dated Oct. 22, 2019, 14 pages.
PCT Invitation to Pay Additional Fees and, Where Applicable, Protest Fee in International Appln. No, PCT/US2018/044633, dated Sep. 11, 2018, 2 pages.
PCT International Preliminary Report on Patentability in International Appln. No. PCT/US2019/042693, dated Feb. 11, 2021, 8 pages.
PCT International Preliminary Report on Patentability in International Appln. No. PCT/US2019/045784, dated Feb. 25, 2021, 10 pages.
Extended European Search Report in European Appln. No. 19842141. 4, dated Mar. 29, 2022, 8 pages.

* cited by examiner

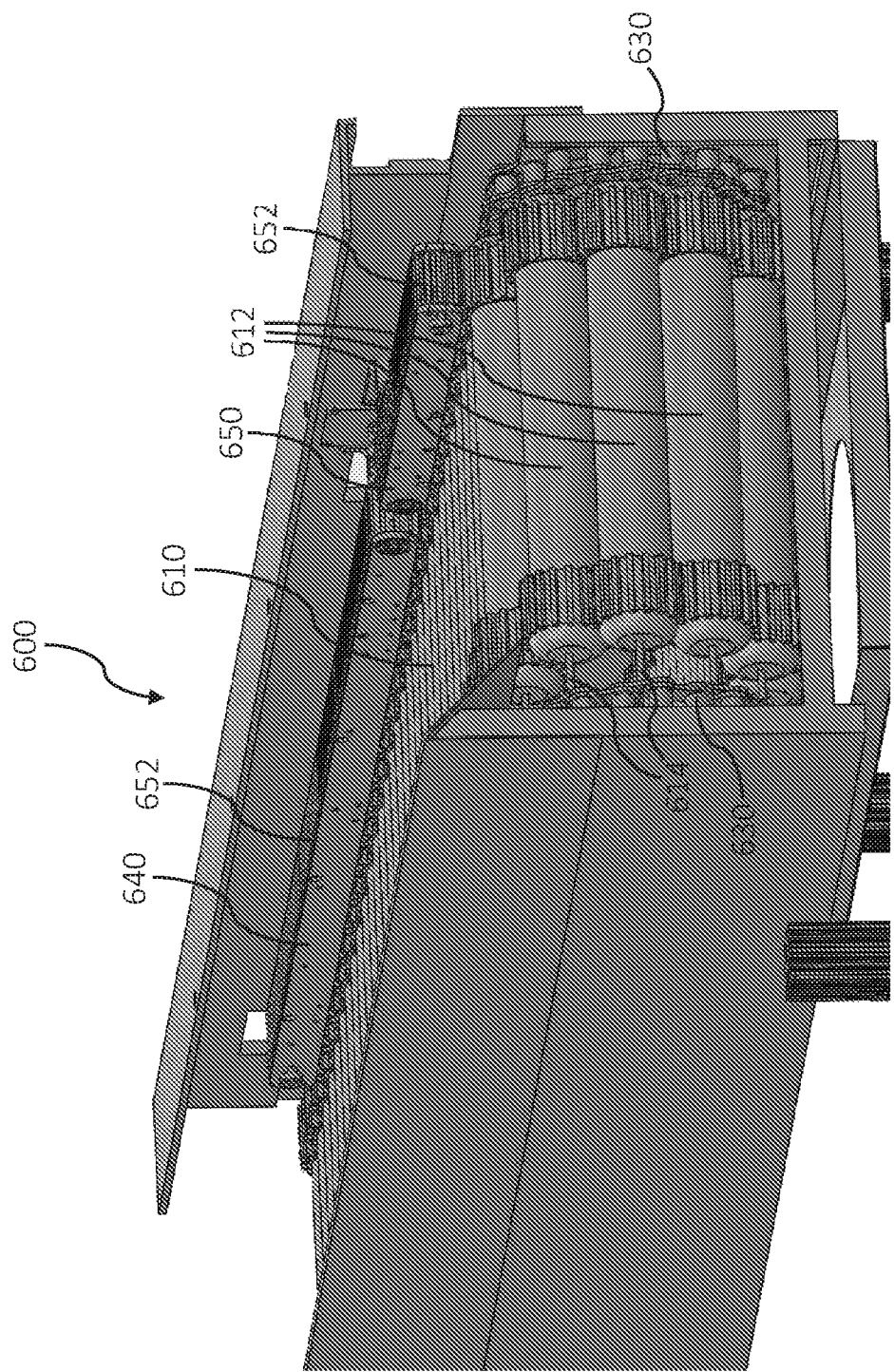

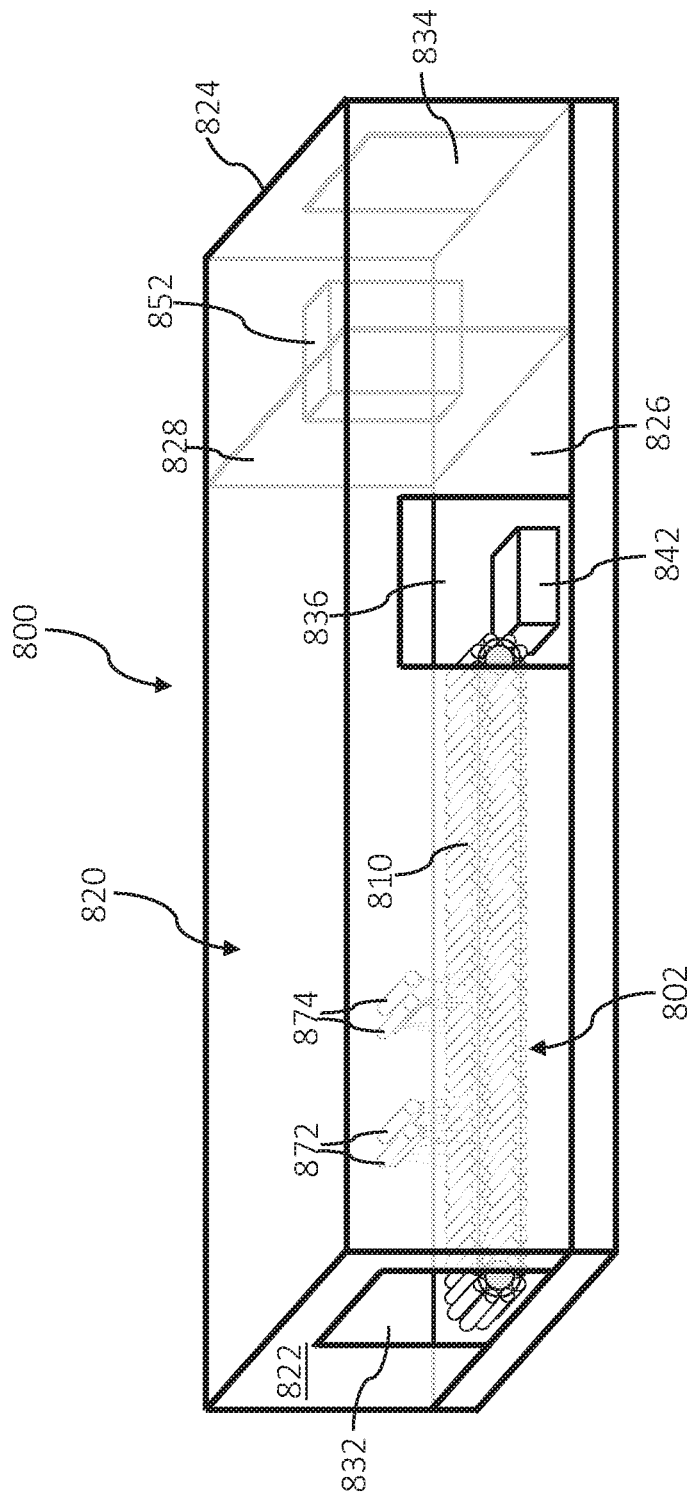

APPARATUS AND METHOD FOR TREATMENT AND INSPECTION OF PRODUCE

CROSS-REFERENCE TO RELATED APPLICATIONS

This application is the National Stage of International Application No. PCT/US2018/04463, which claims the benefit of U.S. Provisional Patent Application Ser. No. 62/539,152, filed Jul. 31, 2017, which is hereby incorporated by reference in its entirety.

TECHNICAL FIELD

The present disclosure relates to conveyor systems designed to facilitate treatment and inspection of produce, agricultural products, and other items.

BACKGROUND

Common agricultural products such as fresh produce are highly susceptible to degradation and decomposition (i.e., spoilage) when exposed to the environment. The degradation of the agricultural products can occur via abiotic means as a result of evaporative moisture loss from an external surface of the agricultural products to the atmosphere and/or oxidation by oxygen that diffuses into the agricultural products from the environment and/or mechanical damage to the surface and/or light-induced degradation (i.e., photodegradation). Furthermore, biotic stressors such as, for example, bacteria, fungi, viruses, and/or pests can also infest and decompose the agricultural products.

After being harvested, produce and other agricultural products are commonly moved to packing houses, where they are sorted and packaged. On many commercial packing lines, the agricultural products are also treated, for example with waxes which preserve the produce or with sanitizing agents which reduce or eliminate bacteria or other biotic stressors. While some of these processes may be performed manually, equipment which either automates the processes or more easily facilitates carrying out the processes can be highly beneficial.

SUMMARY

Described herein are conveyor systems and application units which can be used to treat, or to facilitate treatment and inspection, of produce, agricultural products, other perishable items, or other substrates. The conveyor systems are configured to allow products to be simultaneously rotated as they are moved along a packing line, thereby facilitating the uniform application of spray coatings and/or allowing the products to be uniformly blow dried while they are moved along the packing line. The conveyor systems also allow the entire exterior surface of the products to be visually inspected, either manually or via cameras or other image capturing tools, without requiring handling of the products.

Accordingly, in one aspect, a conveyor system includes a bed comprising a plurality of rollers each having an axis, each roller having a top side corresponding to a top side of the bed and a bottom side opposite the top side, wherein the conveyor system is configured to transport items placed on the top side of the bed and to rotate the items while they are transported. The conveyor system further includes one or more dispensing devices affixed above the top side of the bed, the one or more dispensing devices configured to treat items placed on the top side of the bed as the items move past the one or more dispensing devices. Furthermore, the conveyor system is configured such that during transport of items placed on the top side of the bed, the axes of the rollers adjacent to the items move in a first direction at a first speed while the items move past the one or more dispensing devices, thereby causing the items to move past the one or more dispensing devices at the first speed, and the conveyor system is further configured such that while items placed on the top side of the bed move past the one or more dispensing devices, a rotational rate of each of the rollers adjacent to the items causes a point on the bottom side of each of the rollers adjacent to the items to have an instantaneous velocity that is in a direction parallel to the first direction and to have a second speed that is greater than the first speed.

In another aspect, a conveyor system includes a bed comprising a plurality of rollers each having an axis, each roller having a top side corresponding to a top side of the bed and a bottom side opposite the top side, wherein the conveyor system is configured to transport items placed on the top side of the bed and to rotate the items while they are transported. The conveyor system further includes one or more dispensing devices affixed above the top side of the bed, and a rotation inducing device coupled to a group of rollers that are beneath the one or more dispensing devices. The rotation inducing device is configured to cause each roller of the group of rollers to rotate as the roller moves past the one or more dispensing devices. The conveyor system is configured such that during operation, the axis of each roller of the group of rollers moves in a first direction at a first speed while the roller moves past the one or more dispensing devices, and the rotation inducing device causes a point on the bottom side of each of the rollers of the group of rollers to have an instantaneous velocity that is in a direction parallel to the first direction and to have a second speed that is greater than the first speed while the roller moves past the one or more dispensing devices.

In yet another aspect, a conveyor system that is configured to transport and to simultaneously rotate items includes a bed comprising a plurality of rollers each having an axis. The conveyor system further includes a rotation inducing device coupled to a group of rollers of the bed, the rotation inducing device configured to cause each roller of the group of rollers to rotate about its axis while the group of rollers moves in a first direction. The conveyor system also includes a control unit coupled to the rotation inducing device that enables the rotation inducing device to control a rotational rate of each roller of the first group of rollers.

In still another aspect, a conveyor system that is configured to transport and to simultaneously rotate items includes a bed comprising a plurality of rollers each having an axis. The conveyor system further includes a first rotation inducing device coupled to a first group of rollers of the bed, the first rotation inducing device configured to cause each roller of the first group of rollers to rotate about its axis at a first rotation rate, and a second rotation inducing device coupled to a second group of rollers of the bed, the second rotation inducing device configured to cause each roller of the second group of rollers to rotate about its axis at second rotation rate.

In another aspect, a conveyor system that is configured to transport and to simultaneously rotate items includes a bed comprising a plurality of rollers each having an axis, wherein the plurality of rollers includes a first group of rollers. The conveyor system also includes a rotation inducing device coupled to the first group of rollers. During operation of the conveyor system, the rotation inducing device causes each roller of the first group of rollers to rotate about its axis at a rate that is at least partially independent of the roller's translational speed.

In yet another aspect, an application unit for solvent treatment and drying of perishable items includes an enclosure and a conveyor system comprising a bed, the bed extending from a first opening in a first side of the enclosure towards a second side of the enclosure, wherein the conveyor system is configured to transport and to simultaneously rotate the perishable items. The application unit further includes a fluid dispensing device configured to dispense the solvent on the perishable items while the perishable items are transported and simultaneously rotated on the bed, and a blower configured to blow gas onto the perishable items while the perishable items are transported and simultaneously rotated on the bed and after the solvent has been dispensed on the perishable items. The application unit also includes a second opening in a third side of the enclosure, the second opening being adjacent to an end of the bed. The third side of the enclosure extends from the first side of the enclosure to the second side of the enclosure In another aspect, a method of treating a substrate includes placing the substrate on a bed of a conveyor system, thereby causing the bed to transport and to simultaneously rotate the substrate, and dispensing fluid on the substrate while substrate is being transported and simultaneously rotated. While the fluid is being dispensed on the substrate, the substrate moves in a first direction at a first speed, and a point on a surface of the substrate that is opposite the bed has an instantaneous velocity in the first direction and a speed greater than the first speed.

In another aspect, a method of treating a substrate includes placing the substrate on a bed of a conveyor system, thereby causing the bed to transport and to simultaneously rotate the substrate, and dispensing fluid onto the substrate from a first fluid dispensing device while the substrate is transported and simultaneously rotated The method further includes, after dispensing the fluid onto the substrate from the first fluid dispensing device, dispensing fluid onto the substrate from a second fluid dispensing device while substrate is transported and simultaneously rotated.

Conveyor systems, application units, and methods described herein can each include one or more of the following features, either alone or in combination with one another. The second speed can be at least two times the first speed. The second speed can be greater than two times the first speed. The system can further comprise a rotation inducing device coupled to the top side of the bed. The rotation inducing device can be configured to contact the rollers adjacent to items placed on the top side of the bed while the items move past the one or more dispensing devices, thereby causing each roller of the first group of rollers to rotate. During operation of the conveyor system, a portion of each roller in contact with the rotation inducing device can have zero instantaneous velocity. During operation of the conveyor system, a portion of the rotation inducing device contacting the rollers can move in a direction opposite the first direction, thereby causing the portion of each roller in contact with the rotation inducing device to have an instantaneous velocity in a direction opposite the first direction.

The conveyor system can be configured such that the axes of the rollers adjacent to items placed on the top side of the bed are coplanar while the items move past the one or more dispensing devices. Any of the conveyor systems described herein can include one or more dispensing devices which can be affixed over the bed of the conveyor system. The one or more dispensing devices can be configured to spray liquid droplets onto items placed on the top side of the bed as the items move past the one or more dispensing devices. The one or more dispensing devices can be configured to blow gas onto items placed on the top side of the bed as the items move past the one or more dispensing devices, thereby drying the items. The conveyor system can be configured such that the rotational motion of each of the rollers adjacent to items placed on top of the bed causes the items to rotate in a direction opposite the rotational motion of each of the underlying rollers while the items move past the one or more dispensing devices.

Any of the dispensing devices described herein can comprise a sprayer configured to spray liquid droplets onto the items placed on the top side of the bed as the items move past the one or more dispensing devices. Any of the dispensing devices described herein can comprise a blower configured to blow gas onto the items placed on the top side of the bed as the items move past the one or more dispensing devices, thereby drying the items. The rotation inducing device can comprise a belt that contacts the rollers of the group of rollers. The control unit can comprise a motor configured to drive the belt at a user defined speed.

The first and second rotation inducing devices can be configured such that the first and second rotation rates are independently controlled. The conveyor system can further comprise a first dispensing device over the first group of rollers. The first dispensing device can be selected from the group consisting of a blower and a sprayer. The conveyor system can further comprise a second dispensing device over the second group of rollers. The first dispensing device can comprise a sprayer and the second dispensing device can comprise a blower.

Dispensing fluid on the substrate can comprise spraying a liquid on the substrate. Dispensing fluid on the substrate can comprise blowing gas on the substrate. The item or substrate can comprise a piece of produce. The substrate can be rotated at a first rotation rate while fluid from the first dispensing device is dispensed over the substrate, and the substrate can be rotated at a second rotation rate different from the first rotation rate while fluid from the second dispensing device is dispensed over the substrate. The plurality of rollers can include a second group of rollers, and the conveyor system can comprise a second rotation inducing device coupled to the second group of rollers. The first group of rollers can comprise all of the rollers of the plurality of rollers.

A length of the third side of the enclosure can be less than about 14 meters. A length of the bed can be less than about 10 meters. The application unit can include a collection bin adjacent to the second opening. The application unit can include an electrical control unit comprising at least one of a fuse box, a breaker box, a power converter, and a power regulator. The application unit can include a barrier separating a first area of the enclosure from the second area of the enclosure. The first area of the enclosure can contain the conveyor system and the second area of the enclosure can contain the electrical control unit. The bed can include a plurality of rollers each having an axis, the plurality of rollers including a first group of rollers, and the conveyor system can comprise a rotation inducing device coupled to the first group of rollers. The plurality of rollers can further include a second group of rollers, and the conveyor system can comprise a second rotation inducing device coupled to the second group of rollers.

As used herein, a "substrate" refers to an item that is transported by any of the conveyor systems described herein and optionally treated during transport. A substrate can, for example, include an agricultural product or a piece of produce such as a fruit or vegetable.

BRIEF DESCRIPTION OF THE DRAWINGS

FIGS. 6A and 6B are perspective views of another exemplary conveyor system.

FIG. 8 is a perspective view of an exemplary application unit.

Like numerals in the figures represent like elements.

DETAILED DESCRIPTION

Conveyor systems can be used in produce packing houses to transport harvested produce, agricultural products, or other perishable items from one section of the packing house to another. For example, produce can be received at a receiving dock, where it is then sorted, for example by size, color, and/or stage of ripening. The sorted produce can then be transported via conveyor systems to other sections of the packing house, where it can, for example, be treated (e.g., sanitized, coated with protective waxes, and/or dried) and then packaged for storage or delivery.

Figure 1:
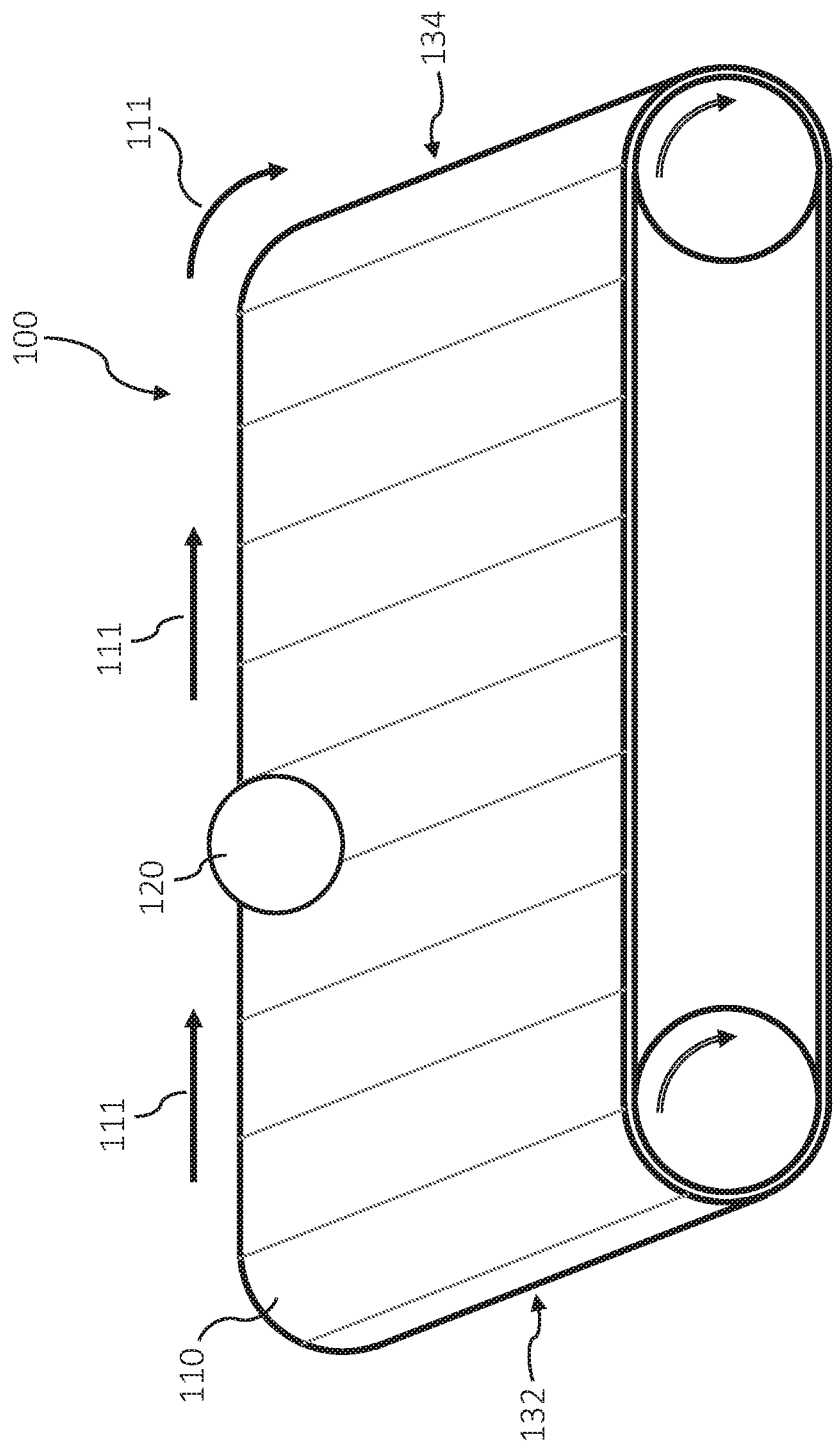
FIG. 1 is a schematic diagram of an exemplary conveyor system.

An exemplary conveyor system 100 that can, for example, be used for transport of produce within packing houses is illustrated in FIG. 1. The conveyor system 100 includes a bed 110 that moves in the direction indicated by arrows 111. Produce or other perishable items 120 are placed on the upper surface of the bed 110 and then transported from the first side 132 to the second side 134 of the conveyor system 100. The bed 110 can be formed of a sanitary material, or of a material that can be readily sanitized or disinfected, in order to prevent the produce from being exposed to or infected by bacteria, fungi, viruses, or other biotic stressors. The bed 110 can also be designed to be easily detachable from the rest of the system in order to simplify sanitization procedures.

On many produce packing lines, it can be desirable to visually inspect the produce while it is in transport on a conveyor system, as this can eliminate the need for an intermediate inspection station. Furthermore, in some cases it can be desirable to integrate other components into the conveyor system to allow for simultaneous treatment and transport of the produce. For example, one or more sprayers can be mounted over the bed and used to spray liquid droplets of solvent or solution on the produce as it passes the sprayers. The liquid spray can, for example, include a sanitizing agent such as ethanol. As further described below, the liquid spray can, for example, include a coating agent which forms a protective coating over the produce on which it is sprayed. Other types of equipment and components for treating produce on the conveyor system bed can also be mounted over or integrated into the conveyor system. For example, fans, blowers, or air knives can be mounted over the bed and used to blow air or other gasses (e.g., nitrogen gas or air/nitrogen mixtures) onto the produce in order to dry the produce.

In the conveyor system of FIG. 1, the produce 120 remains stationary with respect to the bed 110 during transport. That is, relative to (or in the reference frame of) the bed 110, the produce 120 does not roll, slide, or otherwise move. As such, only a portion of the outer surface of the produce 120 can be visibly observed without handling or manually moving the produce while the produce is being transported on the bed 110.

Figure 2:
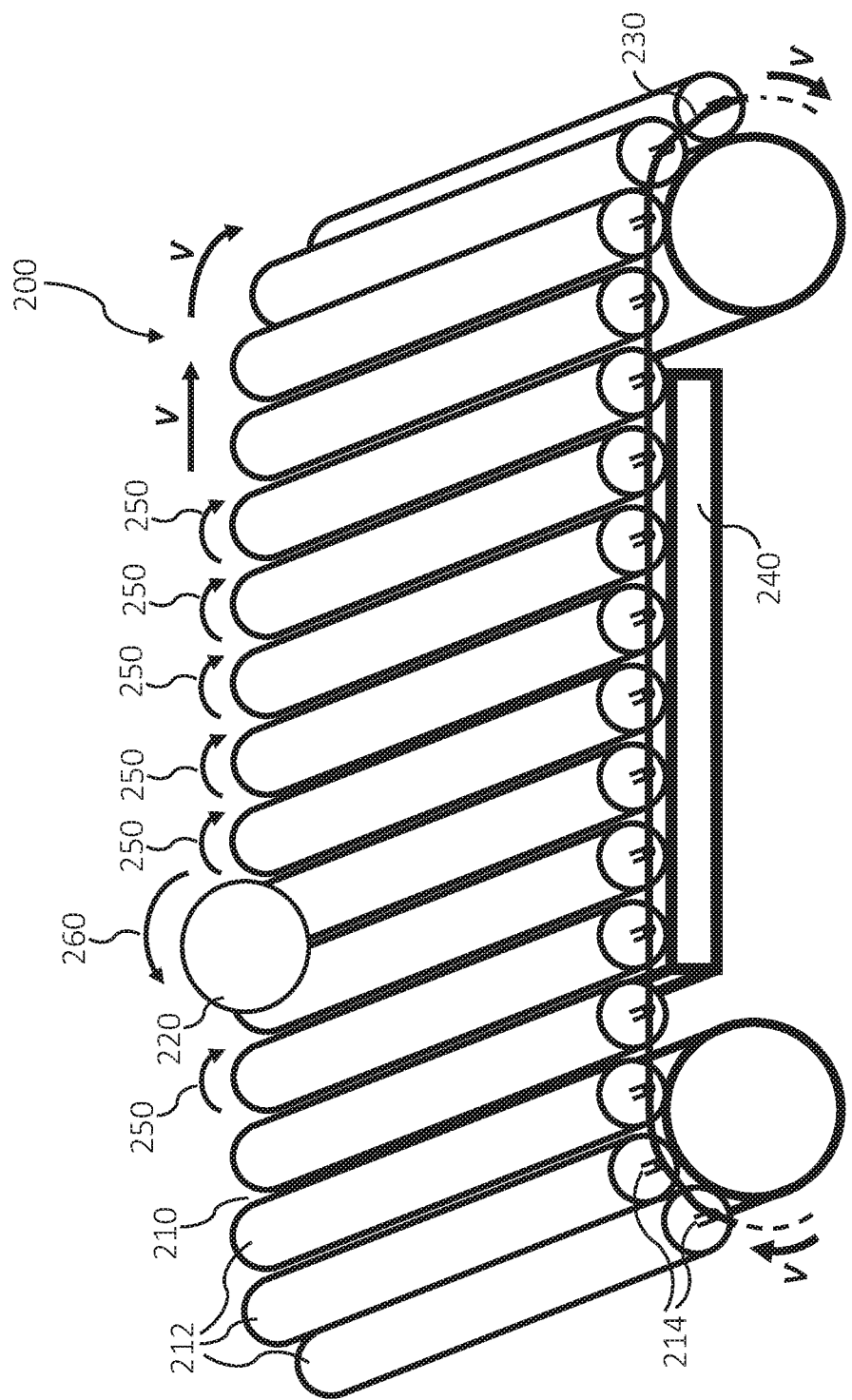
FIG. 2 is a schematic diagram of another exemplary conveyor system.

FIG. 2 illustrates another exemplary conveyor system 200 that can be used to move substrates such as produce, perishable items, or other objects. In conveyor system 200, the bed 210 on top of which the substrate or other item 220 is placed is formed from a plurality of cylindrical rollers 212, each having an axis 214 parallel to that of each of the other rollers 212. The spacing between axes 214 of adjacent rollers 212 is slightly larger than two times the radius of each roller 212, thereby allowing the item 220 to rest on the top side of the bed over the gap between adjacent rollers 212 without falling through the gap. The rollers 212 are pulled in a direction perpendicular to their axes 214 at a translational speed v, as indicated in FIG. 2 by the arrows labeled "v". In the example of FIG. 2, the axes 214 of each of the rollers are connected to a cable or chain 230 driven by a motor (not shown), where the motor controls the motion/speed of the cable or chain 230, thereby controlling the translational speed v of the bed 210. The rollers 212 are each configured to be able to rotate about their axes 214, either by allowing the axes 214 to rotate (i.e., with minimal rotational friction) relative to the cable or chain 230, or by fixing the axes 214 relative to the cable or chain 230 and allowing the outer portion of the rollers 212 to rotate about each of their respective axes 214. For the sake of clarity, only a portion of the bed 210 and cable or chain 230 are shown in FIG. 2 (the remainder of the bed 210 and cable/chain 230 wrap around such that the rollers 212 and cable/chain 230 form a complete loop).

As further illustrated in FIG. 2, the conveyor system 200 also includes a rotation inducing device 240 affixed beneath the bed 210 and coupled to the rollers 212. That is, the rotation inducing device 240 is coupled to the bottom side of the bed 210 and is configured to cause rollers passing over it to rotate. As used herein, the "top side" of the bed refers to the side of the bed on which produce or other items to be transported are placed, and the "bottom side" of the bed refers to the side opposite the top side. As used herein, the "top side" of each roller refers to the side of the roller that is instantaneously on the top side of the bed (i.e., adjacent to items placed on the bed), and the "bottom side" of each roller is the side of the roller opposite the top side of the roller. In the configuration shown in FIG. 2, the rotation inducing device 240 is implemented as a friction bar which contacts the bottom side of the rollers 212. The friction bar prevents surfaces that contact it from sliding, thereby causing rollers 212 that are in contact with the friction bar to rotate as the rollers 212 pass over and contact the friction bar. The rotation of the rollers 212 that contact the friction bar, indicated by arrows 250, causes objects 220 that are sitting on the bed and contacting the rotating rollers to rotate in a direction opposite to that of the rotating rollers, as indicated by arrow 260 and described in more detail below.

Figure 3:
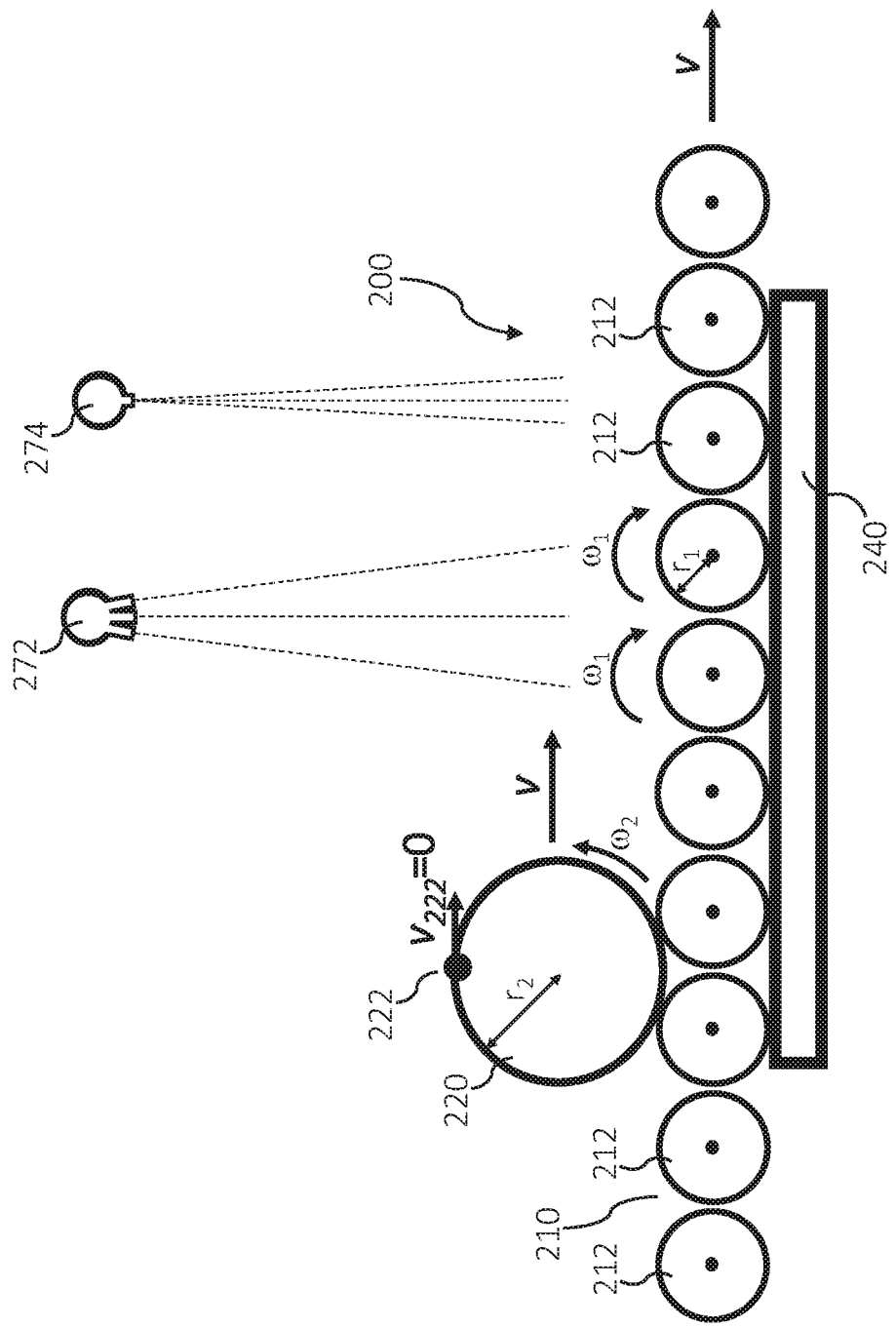
FIG. 3 is a cross-sectional diagram of a portion of the conveyor system of FIG. 2.

FIG. 3, which is a cross-sectional view of a portion of the conveyor system 200 of FIG. 2, illustrates the motion of an item 220 placed on the conveyor system 200 during operation, where item 220 is assumed to be spherical with radius $r_2$. As shown in FIG. 3, when rollers 212 of radius $r_1$ move over the friction bar 240 at a speed v, they also rotate with angular velocity $\omega_1=v/r_1$. That is, in a reference frame in which the rollers are stationary (i.e., a reference frame moving relative to the ground at a speed v in the same direction as the rollers), the axes of the rollers have zero translational velocity and the rollers rotate with an angular velocity $\omega_1=v/r_1$ in the direction indicated in FIG. 3. Item 220, which is placed on the bed 210 over the gap between two adjacent rollers 212, stays over the gap as the bed moves, and therefore moves laterally in the same direction as the rollers at a speed v. Furthermore, due to the rotational motion of the rollers, item 220 also rotates with angular velocity $\omega_2=\omega_1*(r_1/r_2)$ while it is being laterally transported, as shown. However, the rotational direction of the item 220 (direction of $\omega_2$) is opposite that of the rollers 212 (direction of $\omega_1$), as indicated by the arrows in FIG. 3. That is, from the viewpoint shown in FIG. 3, the rollers 212 rotate in a clockwise direction, while item 220 rotates in a counter-clockwise direction.

While the conveyor system 200 of FIGS. 2 and 3 may be more complex and costly than conveyor system 100 of FIG. 1, it can in many applications provide several advantages. For example, in the case of harvested produce being transported within a packing house, conveyor system 200 allows the entire surface of the produce to be visually inspected during transport, since the produce is simultaneously rotated and laterally transported. For conveyor system 100, since the produce does not rotate or otherwise move relative to the bed during transport, only a portion of the outer surface is visible.

Still referring to FIGS. 2 and 3, in some implementations, conveyor system 200 optionally includes one or more dispensing devices 272/274 (shown in FIG. 3 but omitted from FIG. 2 for the sake of clarity) mounted above the top side of the bed and configured to treat produce or other items 220 on the bed 210 as they are transported past the dispensing devices 272/274. For example, dispensing devices 272 are sprayers which are configured to spray liquid solvent or solution on the produce or other items 220 as they pass beneath the sprayers 272, and dispensing devices 274 are fans, blowers, or air knives configured to blow air or other gasses (e.g., nitrogen gas or air/nitrogen mixtures) onto the produce/items 220 in order to dry the produce/items 220 as they pass beneath the fans, blowers, or air knives 274. While FIG. 3 shows both sprayers 272 and blowers (e.g., air knives) 274 mounted over the bed 210, the conveyor system may be equipped with only a single type of dispensing device (e.g., sprayers or air knives but not both), or alternatively with two or more (e.g., three or more) different types of dispensing devices. In some embodiments, when blowers are implemented with conveyor system 200 or any other conveyor systems described herein, the exhaust/nozzle where air or other gas is emitted is mounted above the bed, while the compressor and/or motor is not mounted over the bed but is connected to the exhaust/nozzle. Accordingly, as used herein, a "blower" refers either to an entire unit/apparatus designed to generate air/gas flow and to dispense the air/gas, or to a portion of the apparatus through which the air/gas is dispensed (e.g., the motor, compressor, pressurized gas tank, exhaust or nozzle).

Due to the rotation of objects transported on conveyor system 200 of FIGS. 2 and 3, as compared to conveyor system 100, sprayers 272 mounted above the bed are better able to cover the entire surface of each of the objects with solvent/solution as they move past the sprayers. Additionally, as compared to conveyor system 100, for conveyor system 200, air knives or blowers 274 mounted over the bed are better able to dry the entire surface of each of the objects as they move past the air knives or blowers.

Figure 4:
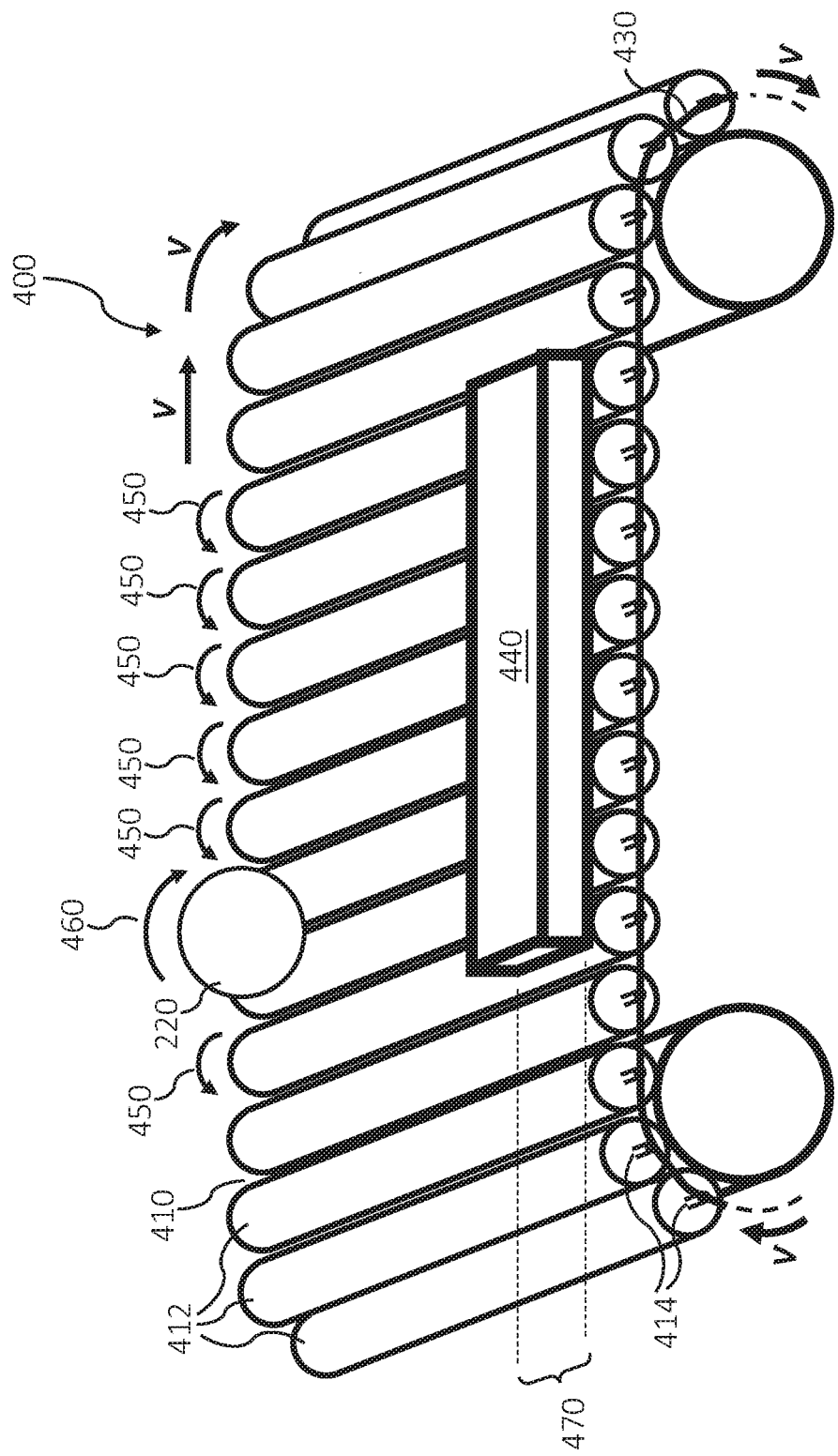
FIG. 4 is a schematic diagram of another exemplary conveyor system.

FIG. 4 is a diagram of another conveyor system 400 that is capable of simultaneously rotating and laterally transporting produce, perishable items, or other objects. Conveyor system 400 is similar to conveyor system 200 of FIG. 2, except that the rotation inducing device 440 (e.g., a friction bar) is coupled to the top side of the bed 410, rather than to the bottom side. That is, as shown in FIG. 4, when rotation inducing device 440 is implemented as a friction bar in conveyor system 400, the friction bar contacts the top side of the bed 410. Although not shown in FIG. 4 for the sake of clarity, the rotation inducing device 440 can be affixed to the ground, a wall, or a stationary portion of conveyor system 400 in order to hold it in place while rollers 412 pass beneath it.

Figure 5:
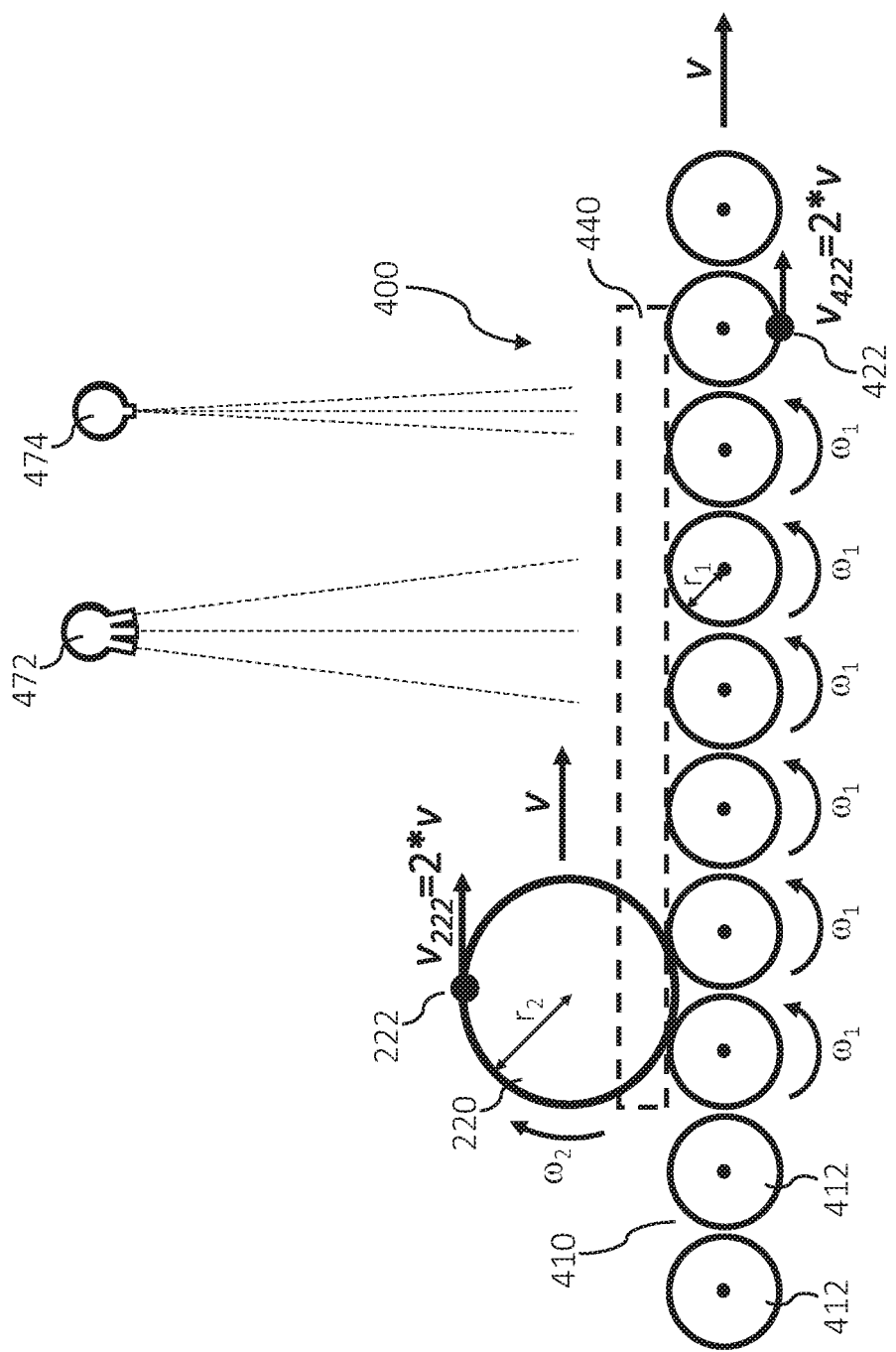
FIG. 5 is a cross-sectional diagram of a portion of the conveyor system of FIG. 4.

FIG. 5, which is a cross-sectional view of a portion of the conveyor system 400 of FIG. 4, illustrates the motion of an item 220 placed on conveyor system 400 during operation, where item 220 is again assumed to be spherical with radius $r_2$. As shown in FIG. 5, when rollers 412 of radius $r_1$ pass beneath the friction bar 440 at a speed v, they also rotate with angular velocity $\omega_1=v/r_1$. That is, in a reference frame in which the rollers 412 are stationary (i.e., a reference frame moving relative to the ground at a speed v in the same direction as the rollers), the axes 414 of the rollers 412 have zero translational velocity, and the rollers 412 rotate with an angular velocity $\omega_1=v/r_1$ in the direction shown, which is opposite the direction of rotation of rollers 212 in conveyor system 200 of FIG. 2. Item 220, which is placed on the bed 410 over the gap between two adjacent rollers 412, stays over the gap as the bed moves, moving laterally in the same direction as the rollers at a speed v. Furthermore, due to the rotational motion of the rollers, item 220 also rotates with angular velocity $\omega_2=\omega_1*(r_1/r_2)$ while it is being laterally transported. Again, the rotational direction of the item 220 is opposite that of the rollers 412, as indicated by the arrows in FIG. 5. That is, from the viewpoint shown in FIG. 5, the rollers 412 rotate in a counter-clockwise direction, while item 220 rotates in a clockwise direction. As such, while item 220 is transported at a speed v in the same direction as that shown for conveyor system 200 in FIGS. 2 and 3, the item is rotated with the same angular velocity $\omega_2$ (in terms of magnitude) but in the opposite direction as compared to the rotation of the item on conveyor system 200.

As compared to conveyor system 200 of FIG. 2, conveyor system 400 may have the disadvantage that for a given axial length of the rollers and length of bed in the direction of motion, a smaller amount of produce or other items can fit on the bed, since a portion of the top surface of the bed (e.g., region 470 in FIG. 4) is blocked by the rotation inducing device. Consequently, conveyor system 400 of FIG. 4 can have a lower throughput than a similarly sized conveyor system 200 of FIG. 2 for which the beds of both conveyor systems are moved at the same speed.

Similar to conveyor system 200, conveyor system 400 of FIGS. 4 and 5 can in many applications also provide several advantages over conveyor system 100 of FIG. 1. For example, in the case of harvested produce or other perishable items being transported within a packing house, conveyor system 400 also allows the entire surface of the produce to be visually inspected during transport, since the produce is simultaneously rotated and laterally transported. For conveyor system 100, since the produce does not rotate or otherwise move relative to the bed during transport, only a portion of the outer surface is visible.

Also similar to conveyor system 200, in some implementations, conveyor system 400 optionally includes one or more dispensing devices 472/474 (shown in FIG. 5 but omitted from FIG. 4 for the sake of clarity) mounted above the top side of the bed and configured to treat produce or other items 220 on the bed 410 as they are transported past the dispensing devices 472/474. For example, dispensing devices 472 are sprayers which are configured to spray liquid solvent or solution on the produce or other items 220 as they pass beneath the sprayers 472, and dispensing devices 474 are fans, blowers, or air knives configured to blow air or other gasses (e.g., nitrogen gas or air/nitrogen mixtures) onto the produce/items 220 in order to dry the produce/items 220 as they pass beneath the fans, blowers, or air knives 474. While FIG. 5 shows both sprayers 472 and blowers (e.g., air knives) 474 mounted over the bed 410, the conveyor system may be equipped with only a single type of dispensing device (e.g., sprayers or air knives but not both), or alternatively with two or more (e.g., three or more) different types of dispensing devices.

Due to the rotation of objects transported on conveyor system 400 of FIGS. 4 and 5, as compared to conveyor system 100, sprayers mounted above the bed are better able to cover the entire surface of each of the objects with solvent/solutions as they move past the sprayers. Additionally, as compared to conveyor system 100, for conveyor system 400, air knives or blowers mounted over the bed are better able to dry the entire surface of each of the objects as they move past the air knives or blowers.

Referring again to FIGS. 3 and 5, as previously described, the angular rate of rotation $\omega_2$ of an object 220 having an average radius $r_2$ placed on either conveyor system 200 (FIG. 3) or conveyor system 400 (FIG. 5) and transported laterally at a speed v will be the same for both conveyor systems (with only the direction of rotation being different). Furthermore, for both conveyor systems 200 and 400, assuming object 220 to be spherical with radius $r_2$, object 220 undergoes a complete rotation after having traveled a lateral distance of $2\pi r_2$. As such, for both conveyor systems 200 and 400, if multiple dispensing devices (272, 274, 472, or 474) are placed over the bed 210/410 such that the fluid is dispensed over a lateral distance of at least $2\pi r_2$ (where $r_2$ is the average radius of the object placed on the bed), the object 220 will undergo a complete rotation while having fluid dispensed thereon, and so in both cases the fluid will be dispensed over the entire surface of the object 220.

As previously described, while produce or other agricultural products (e.g., object 220) are transported on either of conveyor systems 200 or 400, a protective coating (e.g., an edible coating) can simultaneously be formed over the surface of the object 220. For example, in cases where the conveyor system 200/400 is equipped with sprayers 272/472, while the object 220 is being transported and simultaneously rotated, sprayers 272/472 can spray droplets of a solution, suspension, or emulsion including a coating agent (e.g., a solute) in a solvent over the surface of the object. The solvent can then be allowed to evaporate while the object 220 is still on the conveyor system 200 (or alternatively after the object 220 has been removed from the conveyor system 200), thereby allowing the solute composition remaining on the surface of the object 220 to form the protective coating over the surface. In cases where the conveyor system 200/400 is equipped with both sprayers 272/472 and blowers 274/474, as in FIGS. 3 and 5, while the object 220 is being transported and simultaneously rotated, sprayers 272/472 can first spray droplets of a solution, suspension, or emulsion including a coating agent (e.g., a solute) in a solvent over the surface of the object. Once the object is covered with solution, suspension, or emulsion, it then passes beneath the blowers 274/474, which expedites the removal of the solvent while the object 220 is on the conveyor system 200, thereby allowing the solute composition remaining on the surface of the object 220 to form the protective coating over the surface.

The protective coating formed from the solute composition can be used to prevent food spoilage due to, for instance, moisture loss, oxidation, or infection by a foreign pathogen. The solvent in which the coating agent is dissolved or suspended can, for example, be water, an alcohol (e.g., ethanol, methanol, isopropanol, or combinations thereof), acetone, ethyl acetate, tetrahydrofuran, or combinations thereof. The coating agent can, for example, include monoacylglycerides, fatty acids, esters, amides, amines, thiols, carboxylic acids, ethers, aliphatic waxes, alcohols, organic salts, inorganic salts, or combinations thereof. In some implementations, the coating agent includes monomers, oligomers, or combinations thereof, including esters formed thereof. Examples of coating agents and solvents used in the formation of protective coatings can be found in U.S. patent application Ser. No. 15/330,403, titled "Precursor Compounds for Molecular Coatings", which is hereby incorporated by reference in its entirety.

As described above, for both conveyor systems 200 and 400, a spherical object of radius $r_2$ placed on the conveyor system will undergo a complete rotation after it has traveled a lateral distance of $2\pi r_2$. As such, if an object placed on the conveyor system is to have a coating formed thereon by spraying a solution over the surface of the object, for both conveyor systems 200 and 400 sprayers 272/472 can be configured such that they spray solution over a lateral distance of at least $2\pi r_2$ in order to ensure that the solution is sprayed over the entire surface of the object. Furthermore, when blowers/air knives 274/474 are included, for example in the configuration shown in FIGS. 3 and 5, the blowers/air knives 274/474 can be configured such that they blow air or other gas over a lateral distance of at least $2\pi r_2$ in order to ensure that the entire surface of the object is directly exposed to blown air/gas.

Conveyor systems 200 and 400 of FIGS. 2 and 4 were assembled and used to form coatings over avocados by spraying a solution comprising a coating agent in a solvent over the surfaces of the avocados while the avocados were transported and simultaneously rotated, and then blowing air on the avocados while the avocados were transported and simultaneously rotated to remove the solvent, thereby forming the coating. For both conveyor systems, for an object transported at the same lateral speed v, because the rotation rate of the object placed on either of conveyor systems 200 and 400 is the same, it was expected that the two systems would be equally effective for forming coatings over the surface of the object by spraying a solution on the object and then drying the object using the methods described above. That is, for both conveyor systems 200 and 400 configured with similar spray heads 272/472 and air knives 274/474 as shown in FIGS. 3 and 5, it was expected that both systems would be equally effective for spraying solution over the entire surface of the object and then drying the object in order to form a protective coating from a coating agent contained in the liquid dispensed by the spray heads 272/472. However, through extensive experimentation, it was unexpectedly found that similar objects were dried much more quickly and effectively by air knives mounted over conveyor system 400 than by an identical air knife configuration (e.g., same geometric configuration and same rate of air flow) mounted over conveyor system 200. For example, avocados that had solutions sprayed thereon and were then blown by a single air knife extending laterally (i.e., extending in a direction perpendicular to the direction of transport) over the conveyor system had substantially more solvent remaining on their surfaces when dried with conveyor system 200 than when dried under identical drying conditions with conveyor system 400, as was readily observable by visual inspection. Thus, even though the bed of system 400 had less effective surface area and therefore lower throughput than that of system 200 for reasons previously described, system 400 was found to be substantially more effective at drying avocados using the methods described herein.

Without wishing to be bound by theory, it is believed that the improved performance of the configuration of conveyor system 400, as compared to that of conveyor system 200, is related to the instantaneous speed of the point 222 (labeled in FIGS. 3 and 5) on item 220, which is the point instantaneously at the top of item 220 (i.e., the point furthest from the bed 210/410). Referring to FIG. 3, for item 220 being transported on conveyor system 200, if item 220 is spherical with radius $r_2$ as shown, the angular velocity $\omega_2$ at which the item 220 rotates is given by $\omega_2=(r_1/r_2)*\omega_1$, where $r_1$ and $\omega_1$ are the respective radius and angular velocity of each rotating roller 212. The instantaneous speed of point 222 is given by $v_{222}=v-(r_2*\omega_2)=v-(r_1*\omega_1)=v-v=0$. That is, point 222 is instantaneously at rest while item 220 is transported by conveyor system 200.

Consider now the motion of item 220 while being transported by conveyor system 400, as shown in FIG. 5. If item 220 is spherical with radius $r_2$, as shown, the magnitude of the angular velocity $\omega_2$ at which the item 220 rotates is given by $\omega_2=(r_1/r_2)*\omega_1$, which is the same as that of item 220 in FIG. 3. However, because the direction of rotation of item 220 while being transported on conveyor system 400 is opposite that while being transported on conveyor system 200, the instantaneous speed of point 222 is given by $v_{222}=v+(r_2*\omega_2)=v+(r_1*\omega_1)=v+v=2*v$. That is, point 222 has an instantaneous speed that is greater than the translational speed v of the rollers on the bed, and is in fact equal to two times the translational speed of item 220 while item 220 is transported by conveyor system 400. Note also that for this configuration, the velocity of point 422, the point on the bottom side of the rollers (see FIG. 5), is also greater than the translational speed v of the rollers on the bed, and is in fact the same as that of point 222 (i.e., $v_{422}=v_{222}=2*v$).

Without wishing to be bound by theory, in the case of conveyor system 200 of FIGS. 2 and 3, it is believed that because the uppermost portion of each item being dried (i.e., point 222) is instantaneously at rest while the item moves past the air knife, the air being blown onto its surface is concentrated at a single point/region for a longer period of time. Conversely, in the case of conveyor system 400 of FIGS. 4 and 5, the uppermost portion of the surface of each item being dried moves at a speed greater than the translational speed of the item, thereby potentially allowing the flow of air from the air knife to better wrap around the entire surface of each item as the item moves past the air knife and improving the drying efficiency.

Figure 6B:
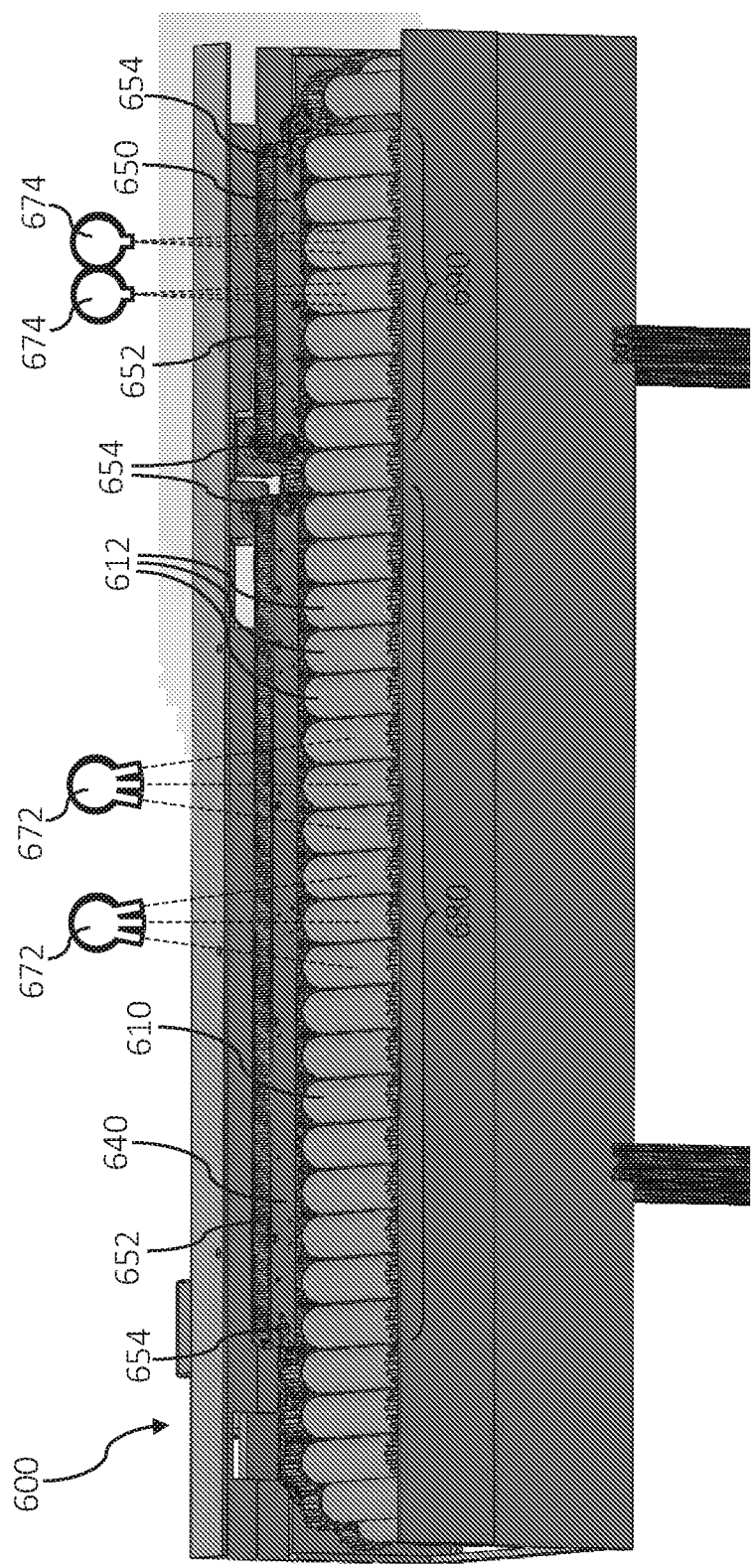

FIGS. 6A and 6B are views from various perspectives of another conveyor system 600 that is capable of simultaneously rotating and transporting produce, perishable items, or other objects. Similar to conveyor systems 200 and 400 of FIGS. 2 and 4, respectively, conveyor system 600 includes a bed 610 formed from a plurality of cylindrical rollers 612, each roller having an axis 614 parallel to that of each of the other rollers 612. The rollers 612 are pulled in a direction perpendicular to their axes 614 at a translational speed v by a chain 630 connected to the axis 614 of each of the rollers. A motor (not shown) drives the chain 630, thereby controlling the translational speed of the bed 610. The rollers 612 are each configured to be able to rotate about their axes 614 by allowing the axes 614 to rotate (i.e., with minimal rotational friction) relative to the chain 630.

Conveyor system 600 further includes multiple rotation inducing devices 640 and 650, each contacting a different set of rollers 612 of bed 610. That is, as shown in FIG. 6B, rotation inducing device 640 induces rotation in the rollers that are instantaneously in region 680 of bed 610, and rotation inducing device 650 induces rotation in the rollers that are instantaneously in region 690 of bed 610. Rotation inducing devices 640 and 650 each include a ribbed belt 652 wrapped around a pair of pulleys (the ends of the axes of the pulleys 654 are labeled in FIG. 6B). As shown, the ribs of the ribbed belts 652 are configured to slot between teeth in the edge regions of each of the rollers 612.

For each of the rotation inducing devices 640 and 650, one or both of the pulleys can be connected to a motor that forces the ribbed belts 652 to rotate about the pulleys 654. The motors can, for example, each be independently controlled by a variable speed motor drive or other electronic controller. In this way, the specific rate of rotation of the rollers contacting the rotation inducing devices 640 and 650 can be precisely controlled. For example, relative to the perspective shown in FIG. 6B, if the rollers 612 are pulled to the right at speed v and the ribbed belt 652 of rotation inducing device 640 rotates about its axes in a clockwise direction, the rate of rotation of each of the rollers 612 in region 680 will be greater than that achieved by using a stationary friction bar to induce rotation, as in FIG. 4. As such, for an object 220 (shown in FIG. 5) transported across region 680 of bed 610 in FIG. 6B, point 222 (i.e., the point furthest from the bed) will have an instantaneous speed in the direction of motion of the rollers that is greater than 2*v, and the point on object 220 directly opposite point 222 will also have a non-zero instantaneous speed in the opposite direction of point 222, where the speed of the point opposite point 222 will be the same as the speed of the ribbed belt 652. Alternatively, relative to the perspective shown in FIG. 6B, if the rollers 612 are pulled to the right at speed v and the ribbed belt 652 of rotation inducing device 640 is held stationary, the rotation inducing device 640 will effectively operate as a friction bar, as in FIG. 4, and the rate of rotation of each of the rollers 612 in region 680 will the same as that achieved by using a stationary friction bar to induce rotation.

In conveyor system 600, the rate of rotation of objects on the bed 610 in each of regions 680 and 690 can be independently controlled by causing the belt on rotation inducing device 640 to move at a different speed than the belt on rotation inducing device 650. This can be advantageous in that multiple processes/treatments to the products being transported can be carried out on the same conveyor system, and the rotational rate of the objects can be adjusted to optimal levels for each of the processes. For example, agricultural products being transported on conveyor system 600 can be both sprayed with a solution, for example to form a coating over the products, and then subsequently blown dry while still on the bed 610.

Consider the case in which a solution which includes a coating agent dissolved in a solvent is sprayed over the entire surface of an object, and the solvent is subsequently removed to form a protective coating from the coating agent over the surface of the object. This entire process can be carried out as follows while the object is transported on conveyor system 600. Consider the configuration illustrated in FIG. 6B, in which one or more sprayers 672 (e.g., first fluid dispensing devices) are mounted over region 680 of the bed 610, and one or more air knives 674 (e.g., second fluid dispensing devices) are mounted over region 690 of the bed 610. Objects being transported on conveyor system 600 can first be spray coated by sprayers 672 while in region 680, where the rotation rate of the objects while being spray coated can be optimized to minimize the distance over which the objects are sprayed while still resulting in the deposition of a uniform layer of solution over each object. Once the objects reach region 690, air knives 674 can blow air or other gas onto the objects in order to increase the rate of solvent removal, and rotation inducing device 650 can cause the objects to rotate at a rate optimized to minimize the time and/or lateral distance that the objects must travel while being blown dry in order to remove substantially all of the solvent and cause the coating agent to form a protective coating over the surface of the object.

Figure 7:
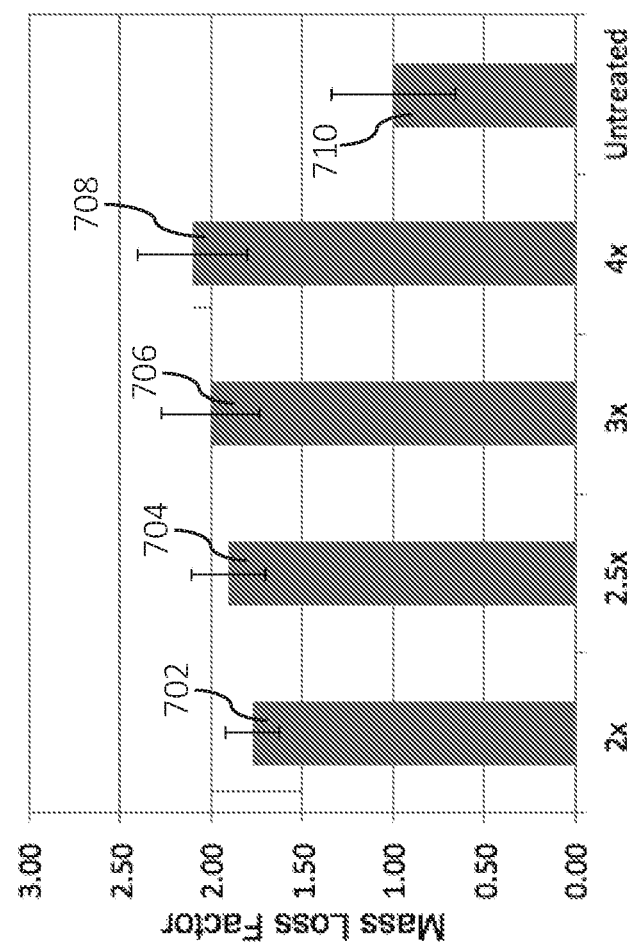
FIG. 7 is a plot of mass loss factor of treated and untreated avocados.

A study was conducted to examine the efficacy of protective coatings that were formed over avocados by spraying solution on the avocados while the avocados were transported and simultaneously rotated at different rotation rates, the results of which are shown in FIG. 7. FIG. 7 is a plot of mass loss factor of avocados that were sprayed with a solution comprising a coating agent dissolved in a solvent and then blown dry to form a protective coating, all while being transported on a conveyor system similar to that shown in FIGS. 6A and 6B. As used herein, "mass loss factor" is defined as the ratio of the average mass loss rate of uncoated produce (measured for a control group) to the average mass loss rate of the corresponding coated produce. Hence a larger mass loss factor corresponds to a greater reduction in average mass loss rate.

For the study of FIG. 7, groups of avocados were transported at a constant translational speed of 5.1 cm/s and spray coated as they passed beneath a single sprayer (672 in FIG. 6B), where the spray rate was held fixed at a rate of 2 mL/s, and only the rotation rate of avocados in the different groups was varied by varying the belt speed of rotation inducing device 640. The avocados were then all dried by passing them beneath an air knife 674 while simultaneously rotating the avocados. For all groups of avocados, the drying conditions (e.g., rate of air flow through the air knife 674 and rotation rate of the avocados as they passed beneath the air knife) was kept the same. One group of avocados was left untreated and used as a control group for determining the mass loss factor of each of the other groups of avocados. Detailed experimental procedures are given in Example 1 below.

In FIG. 7, the avocados corresponding to bar 702 were rotated at a rate corresponding to the top of each avocado (e.g., point 222 in FIG. 5) having an instantaneous speed of 10.2 cm/s (i.e., 2 times the translational speed of each avocado) while passing beneath the sprayer. This was achieved by keeping the belt 652 of rotation inducing device 640 stationary. The avocados corresponding to bar 704 were rotated at a rate corresponding to the top of each avocado (e.g., point 222 in FIG. 5) having an instantaneous speed of 12.7 cm/s (i.e., 2.5 times the translational speed of each avocado) while passing beneath the sprayer. This was achieved by driving the belt 652 of rotation inducing device 640 at a translational speed of 2.5 cm/s. The avocados corresponding to bar 706 were rotated at a rate corresponding to the top of each avocado (e.g., point 222 in FIG. 5) having an instantaneous speed of 15.3 cm/s (i.e., 3 times the translational speed of each avocado) while passing beneath the sprayer. This was achieved by driving the belt 652 of rotation inducing device 640 at a translational speed of 5.1 cm/s. The avocados corresponding to bar 708 were rotated at a rate corresponding to the top of each avocado (e.g., point 222 in FIG. 5) having an instantaneous speed of 20.4 cm/s (i.e., 4 times the translational speed of each avocado) while passing beneath the sprayer. This was achieved by driving the belt 652 of rotation inducing device 640 at a translational speed of 10.2 cm/s. Bar 710 corresponds to the avocados that were left uncoated and used as the control group.

As seen in FIG. 7, within the range of rotation rates used for the plot of FIG. 7, increasing the rotation rate of the avocados during the time that the solution was sprayed onto the avocados resulted in an increase in the mass loss factor of the avocados. Without wishing to be bound by theory, these results suggest that the coating may have been formed more uniformly over the surface of the avocados by rotating the avocados at a higher rotational rate during application of the solution to the surface of the avocados. Additionally, as further described below, optimizing the rotation rate and direction of rotation of transported substrates independently of their translational speed can allow for shorter and/or more compact conveyor systems for treating substrates such as produce (e.g., for forming protective coatings on and/or for solvent treatment and subsequent drying of the substrates).

FIG. 8 is a perspective view of a stand-alone application unit 800 that can be used for forming protective coatings on and/or for solvent treatment and subsequent drying of substrates such as harvested produce or other perishable items. The application unit 800 can, for example, be useful in cases where perishable items such as harvested produce brought to a packing house are treated or coated prior to being sorted and packaged within the packing house, as in this way the produce can be treated/coated without making modifications to the existing packing line within the packing house. Furthermore, making the application unit 800 sufficiently small can reduce construction and operating costs, and can also allow the application unit 800 to be mobile. Mobil units can be useful in that they can, for example, be placed directly adjacent to fields where produce is harvested and optionally moved around, thereby more easily facilitating treatment of the produce immediately after harvesting.

As shown in FIG. 8, the application unit 800 includes an enclosure 820. The enclosure 820 can, for example, be a standard shipping container that is modified to include additional openings and internal walls or barriers, as further described below. A conveyor system 802 is contained within the enclosure 820. The conveyor system 802 can be similar to or the same as any of the conveyor systems described herein. That is, the conveyor system 802 can include a bed 810 made up of a plurality of rollers upon which items to be transported and treated are placed. Although not shown in FIG. 8, the conveyor system can further include one or more rotation inducing devices (such as rotation inducing devices 640 and 650 of FIGS. 6A and 6B) coupled to one or more groups of rollers of the bed. The rotation inducing devices can cause items on the conveyor system to be simultaneously rotated during transport at a rotation rate that can be controlled independently of the speed at which the items are laterally transported. The conveyor system can further include dispensing devices 872 and 874, which dispense fluid onto the items as they are rotated and pass beneath the dispensing devices 872 and 874. For example, dispensing devices 872 can be sprayers for spraying solvents or solutions onto the items, and dispensing devices 874 can be blowers (e.g., air blades) that blow air or other gas onto the items in order to remove solvent from and expedite drying of the items. The bed extends from a first opening 832 (e.g., a doorway) in a first side 822 of the enclosure towards a second side 824 of the enclosure. A third side 826 of the enclosure, which extends from the first side 822 of the enclosure to the second side 824 of the enclosure, includes an opening 836 (e.g., a second doorway) adjacent to the end of the bed. A collection bin 842 may optionally be included at the end of the bed and adjacent to opening 836.

Items such as produce can be treated by the application unit 800 by passing them through opening 832 and loading them onto the bed 810 of the conveyor system 802. The items are then laterally transported on the bed 810 while being simultaneously rotated. As the items pass beneath sprayers 872, solvent or solution is sprayed over the surfaces of the items. The items then pass beneath blowers 874, which serve to dry the items. When the items reach the end of the conveyor system 802, they may fall into or be placed in the collection bin 842 and can then be removed from the application unit 800 through opening 836. Note that although FIG. 8 only shows two blowers 874, the entire length of the bed 810 between sprayers 872 and the end of the bed adjacent to opening 836 can have blowers thereover in order to better dry the items on the bed prior to loading into the collection bin 842. Also, openings 832 and/or 836 can be made large enough so that operators of the application unit 800 may enter and/or exit the enclosure 820 through these openings.

Although not shown in FIG. 8, a number of additional components that may be necessary for the application unit 800 to be functional can also be provided within the enclosure 820. For example, large compressors and/or pressurized gas tanks and/or solvent tanks may be included and connected to dispensing devices 872 and 874 in order to provide the fluid that is dispensed. Additionally, an air conditioning unit and/or a humidity controller and/or ventilation system may be provided in order to maintain atmospheric conditions within the enclosure 820 that are suitable for the treatments and/or coatings being applied to the items on the conveyor system 802 via dispensing devices 872 and 874. Large motors (e.g., servo motors or induction motors) may also be provided to drive the conveyor system 802. These motors can be included as part of the conveyor system 802 (e.g., integrated into the conveyor system), or can be provided separately.

Many of the components that may be necessary for proper operation of the application unit 800, including at least some of the components described above, can have very high electrical power requirements. For example, motors and/or compressors may require 3-phase high voltage AC power supplies and/or high voltage power converters (e.g., AC-DC converters, AC-AC converters, etc). Accordingly, the application unit can further include an onboard electrical control unit 852, which may include components such as power converters, regulators, fuses or breakers (typically contained within a fuse or breaker box), and the like.

Because the conveyor system 802 may utilize volatile solvents (e.g., methanol, ethanol, acetone, isopropanol) within the sprayers 872 for treatment of items placed on the bed 810, in order to mitigate the risk of a solvent fire, it may be preferable to physically separate the high power and/or high voltage electrical components from the region in which airborne solvents are present. Accordingly, as shown in FIG. 8, a barrier or wall 828 can be included within the enclosure 820 which separates the enclosure area into two regions, the conveyor system can be contained within one of these regions, and the electrical control unit 852 can be contained within the other region. An opening (e.g. an access door) 834 can be included in the enclosure to provide access to the region containing the electrical control unit 852.

As previously described, it can be advantageous to make the application unit 800 (and the enclosure 820) as small as possible in order to reduce costs and improve mobility of the unit. The minimum length of the application unit (i.e., the length between side 822 and 824) is at least partially determined by the length of the conveyor system 802, and the minimum length that the conveyor system 802 can be made is the minimum length required to be able to sufficiently coat and subsequently dry the items on the bed using dispensing devices 872 and 874. Thus, reducing the length of the conveyor system, for example by utilizing conveyor system designs similar to those shown in FIGS. 4 and 6A-6B, can allow for sufficiently short enclosure lengths to enable the use of standard size shipping containers for the enclosure (many of which are typically about 40 feet long) and to allow the application unit 800 to be mobile. Furthermore, in order for the application unit to be mobile, it may be necessary that the width of the application unit (i.e., as measured in a direction perpendicular to the length of the application unit) be sufficiently small to allow the application unit to be placed on a trailer and driven on standard roads.

One way to reduce the length of the application unit 800 would be to have the conveyor system extend across the entire length of the application unit, such that items to be treated enter the unit through an opening in one end and exit the application unit through an opening on the opposite end. However, in such a design, providing an electrical control unit that is sufficiently isolated from the conveyor system while still allowing for sufficient room for an operator to be able to comfortably fit inside the enclosure typically requires that the width of the enclosure be larger than permissible for driving on standard roads and also wider than that of standard shipping containers (which are designed to be transported on standard roads). Hence, application unit 800 provides the electrical control unit at the end of the enclosure in order to provide a sufficiently narrow enclosure.

Because the portion of the enclosure containing the electrical control unit 852 takes up a substantial portion of the length of the application unit, conveyor systems similar to those shown in FIGS. 1 and 2 which are capable of sufficiently treating and drying items placed on the conveyor system may be too long to fit into the enclosure if the enclosure is formed from a standard shipping container (typically about 40 feet long). Accordingly, it may be necessary to provide a conveyor system such as that shown in FIG. 4 or 6 in order to both meet the size requirements of the enclosure and to allow items placed on the conveyor system to be treated and fully dried.

In view of the above, the length of the enclosure (corresponding to the length of side 826) can be less than 15 meters, for example less than 14 meters, less than 13 meters, or less than 12 meters. The width of the enclosure can be less than 5 meters, less than 4 meters, less than 3 meters, or less than 2 meters. The length of the length of the bed can be less than 12 meters, for example less than 11 meters, less than 10 meters, less than 9 meters, less than 8 meters, or less than 7 meters.

EXAMPLES

The disclosure is further illustrated by the following examples, which are not to be construed as limiting this disclosure in scope or spirit to the specific procedures herein described. It is to be understood that the examples are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

In the examples below, 2,3-dihydroxypropan-2-yl octadecanoate (i.e., 1-glycero stearate) is abbreviated to SA-1G, hexadecanoic acid (i.e., palmitic acid) is abbreviated to PA, and 1,3-dihydroxypropan-2-yl palmitate (i.e., 2-glycero palmitate) is abbreviated to PA-2G. SA-1G was purchased from Spectrum Chemical Mfg Corp, and PA was purchased from Sigma-Aldrich. PA-2G was prepared following the method of Example 1 in U.S. patent application Ser. No. 15/330,403, titled "Precursor Compounds for Molecular Coatings".

Example 1: Effect of Rotation Rate of Avocados During Spray Coating on the Mass Loss Factor of the Avocados Avocados of similar size, visual quality, and stage of ripening that were all picked at the same time were separated into 4 groups of 120 avocados each and 1 group of 60 avocados. The group of 60 avocados, corresponding to bar 710 in FIG. 7, was untreated. The 4 remaining groups, corresponding to bars 702, 704, 706, and 708 in FIG. 7 were each sprayed with a solution formed by dissolving a solid coating agent formulation in ethanol at a concentration of 10 mg/mL, and then blown dry to form a protective coating. Spraying and drying of the avocados were performed consecutively while the avocados were transported and simultaneously rotated on a conveyor system similar to that shown in FIGS. 6A and 6B. The solid coating agent was formed of SA-1G, PA-2G, and PA mixed at a respective mass ratio of 60:5:35.

The avocados that were transported and treated in the experiment of FIGS. 7 (702, 704, 706, and 708) were all transported at a constant translational speed of 5.1 cm/s. Referring to FIG. 6B, the avocados were first transported across a first region 680 in which their rotational rates were controlled by a first rotation inducing device 640, after which they were transported across a second region 690 in which their rotational rates were controlled by a second rotation inducing device 650. A single sprayer 672 that extended laterally (i.e., in a direction perpendicular to the direction of motion of the avocados) across the entire width of the bed 610 was mounted over the first region 680 and formed a mist of solution over the bed 610. The active width of the bed (i.e., the width of the bed across which avocados were placed) was 30 centimeters. This width also corresponded to the length of the sprayer. The sprayer flowrate was set to 2 mL/s. Avocados were covered by the solution as they traveled through the first region 680 and passed through the mist. A single air knife 674 that extended laterally across the entire width of the bed 610 was mounted over the second region 690. The air knife blew a steady stream of air onto the avocados in order to dry them as the avocados traveled through the second region 690.

While passing through the mist in the first region 680, the avocados corresponding to bar 702 were rotated at a rate corresponding to the top of each avocado (e.g., point 222 in FIG. 5) having an instantaneous speed of 10.2 cm/s (i.e., 2 times the translational speed of each avocado). This was achieved by keeping the belt 652 of rotation inducing device 640 stationary. While passing through the mist in the first region 680, the avocados corresponding to bar 704 were rotated at a rate corresponding to the top of each avocado (e.g., point 222 in FIG. 5) having an instantaneous speed of 12.7 cm/s (i.e., 2.5 times the translational speed of each avocado). This was achieved by driving the belt 652 of rotation inducing device 640 at a translational speed of 2.5 cm/s. While passing through the mist in the first region 680, the avocados corresponding to bar 706 were rotated at a rate corresponding to the top of each avocado (e.g., point 222 in FIG. 5) having an instantaneous speed of 15.3 cm/s (i.e., 3 times the translational speed of each avocado). This was achieved by driving the belt 652 of rotation inducing device 640 at a translational speed of 5.1 cm/s. While passing through the mist in the first region 680, the avocados corresponding to bar 708 were rotated at a rate corresponding to the top of each avocado (e.g., point 222 in FIG. 5) having an instantaneous speed of 20.4 cm/s (i.e., 4 times the translational speed of each avocado). This was achieved by driving the belt 652 of rotation inducing device 640 at a translational speed of 10.2 cm/s. For all 4 groups of coated avocados (702, 704, 706, and 708), during the time that the avocados passed beneath the air knife 674 in the second region 690, the avocados were rotated at a rate corresponding to the top of each avocado (e.g., point 222 in FIG. 5) having an instantaneous speed of 10.2 cm/s (i.e., 2 times the translational speed of each avocado). This was achieved by keeping the belt 652 of rotation inducing device 650 stationary. Bar 710 corresponds to the group of 60 avocados that was left uncoated.

After coating the avocados using the procedures described above, the mass loss rates of the avocados were measured while the avocados were stored under ambient conditions (approximately 20° C. average temperature and about 40%-60% relative humidity). As shown in the plot of FIG. 7, the avocados of group 702 exhibited a mass loss factor of 1.77, corresponding to a 43.5% reduction in mass loss rate as compared to the untreated avocados of group 710. The avocados of group 704 exhibited a mass loss factor of 1.90, corresponding to a 47.4% reduction in mass loss rate as compared to the untreated avocados of group 710. The avocados of group 706 exhibited a mass loss factor of 2.00, corresponding to a 50.0% reduction in mass loss rate as compared to the untreated avocados of group 710. The avocados of group 708 exhibited a mass loss factor of 2.10, corresponding to a 52.4% reduction in mass loss rate as compared to the untreated avocados of group 710.

Various implementations of conveyor systems and associated methods of use have been described above. However, it should be understood that they have been presented by way of example only, and that various changes in form and details may be made. For example, conveyor systems described herein can also be used to transport and optionally treat (e.g., sanitize, coat, and/or dry) other types of substrates, such as meat, poultry, plants, textiles/clothing material, pharmaceuticals, medical equipment, or other substrates, including edible and non-edible substrates. Where methods and steps described above indicate certain events occurring in certain order, those of ordinary skill in the art having the benefit of this disclosure would recognize that the ordering of certain steps may be modified and such modification are in accordance with the variations of the disclosure. Accordingly, other implementations are within the scope of the following claims.

The invention claimed is:

1. A conveyor system comprising:
a bed comprising a plurality of rollers each having an axis, the bed having a top surface onto which items to be transported are placed and a bottom surface opposite the top surface, wherein the axis of each roller adjacent to items located on the top surface of the bed moves in a first direction at a first speed transporting the items located thereon through the conveyor system at the first speed; and
a rotation inducing device configured to contact a portion of each roller on the top surface of the bed, such that the contact prevents sliding between a point and the rotation inducing device, which thereby induces rotation of each such roller about its axis,
wherein each roller in contact with the rotation inducing device has a rotation rate that produces an instantaneous velocity in a direction parallel to the first direction at a second speed greater than the first speed, and
wherein the portion of each roller in contact with the rotation inducing device has zero instantaneous velocity.

2. The conveyor system of claim 1,
wherein each roller has a top side corresponding to the top surface of the bed and a bottom side opposite thereof; and
wherein each roller adjacent to items located on the top surface of the bed has a rotation rate that produces an instantaneous velocity of a point on the bottom side of each roller in a direction parallel to the first direction at a third speed greater than the first speed.

3. The conveyor system of claim 1, wherein the rotation inducing device rotates at least a portion of the plurality of rollers at a rate that is at least partially independent of the first speed of the axis of each roller.

4. The conveyor system of claim 1, further comprising a control unit operatively coupled to the rotation inducing device and configured to control the rotation rate of each roller adjacent to items located on the top surface of the bed.

5. The conveyor system of claim 1, wherein the second speed is at least two times the first speed.

6. The conveyor system of claim 1, further comprising one or more dispensing devices located above the top surface of the bed, wherein the one or more dispensing devices are configured to treat items located on the top surface of the bed as the items are transported thereunder.

7. The conveyor system of claim 6, wherein the rotation of each of the rollers adjacent to items located on the top surface of the bed rotates the items in a direction opposite the rotation of the rollers as the items are transported under the one or more dispensing devices.

8. The conveyor system of claim 6, wherein the one or more dispensing devices are configured to spray liquid droplets onto the items as the items are transported thereunder.

9. The conveyor system of claim 1, wherein the rotation inducing device comprises a belt configured to contact each of the plurality of rollers.

10. A conveyor system, comprising:
a bed comprising a plurality of rollers each having an axis, the bed having a top surface onto which items to be transported are placed and a bottom surface opposite the top surface;
one or more dispensing devices located above the top surface of the bed, wherein the one or more dispensing devices are configured to treat items located on the top surface of the bed as the items are transported thereunder; and
a rotation inducing device operatively coupled to the rollers and configured to contact each roller adjacent to items located on the top surface of the bed to induce rotation of each such roller about its axis,
wherein the axis of each roller adjacent to items located on the top surface of the bed moves in a first direction at a first speed transporting the items located thereon through the conveyor system at the first speed,
wherein each roller adjacent to items located on the top surface of the bed has a rotation rate that produces an instantaneous velocity in a direction parallel to the first direction at a second speed greater than the first speed,
wherein a portion of each roller in contact with the rotation inducing device has zero instantaneous velocity, and
wherein the one or more dispensing devices are configured to blow gas on the items as the items are transported thereunder to at least partially dry the items.

11. A conveyor system comprising:
a bed comprising a plurality of rollers each having an axis, the bed having a top surface onto which items to be transported are placed and a bottom surface opposite the top surface, wherein the axis of each roller in a first group adjacent to the items located on the top surface of the bed moves in a first direction at a first translational speed transporting the items located thereon through the conveyor system at the first translational speed; and
a first rotation inducing device operatively coupled to the first group of the rollers and configured to contact a portion of each roller in the first group on the top surface of the bed, such that the contact prevents sliding between a point and the rotation inducing device, which thereby induces rotation of each such roller about its axis at a first rotation rate;
wherein each roller in the first group in contact with the first rotation inducing device has a rotation rate that produces an instantaneous velocity in a direction parallel to the first direction at a first instantaneous speed greater than the first translational speed, and
wherein the portion of each roller in the first group in contact with the first rotation inducing device has zero instantaneous velocity.

12. A conveyor system comprising:
a bed comprising a plurality of rollers each having an axis, the bed having a top surface onto which items to be transported are placed and a bottom surface opposite the top surface;
a first rotation inducing device operatively coupled to a first group of the rollers and configured to contact each roller in the first group adjacent to the items located on the top surface of the bed to induce rotation of each such roller about its axis at a first rotation rate;
wherein the axis of each roller in the first group adjacent to the items located on the top surface of the bed moves in a first direction at a first translational speed transporting the items located thereon through the conveyor system at the first translational speed;
wherein each roller in the first group adjacent to the items located on the top surface of the bed has a rotation rate that produces an instantaneous velocity in a direction parallel to the first direction at a first instantaneous speed greater than the first translational speed;

wherein a portion of each roller in the first group in contact with the first rotation inducing device has zero instantaneous velocity;

a second rotation inducing device operatively coupled to a second group of the rollers distinct from the first group of rollers and configured to contact each roller in the second group adjacent to items located on the top surface of the bed to induce rotation of each such roller about its axis at a second rotation rate;

wherein the axis of each roller in the second group adjacent to items located on the top surface of the bed moves in the first direction at a second translational speed transporting the items located thereon through the conveyor system at the second translational speed;

wherein each roller in the second group adjacent to items located on the top surface of the bed has a rotation rate that produces an instantaneous velocity in a direction parallel to the first direction at a second instantaneous speed greater than the second translational speed; and wherein a portion of each roller in the second group in contact with the second rotation inducing device has zero instantaneous velocity.

13. The conveyor system of claim 12, further comprising a first dispensing device located above the first group of rollers, wherein the first dispensing device is configured to treat items located on the top surface of the bed as the items are transported thereunder.

14. The conveyor system of claim 13, further comprising a second dispensing device located above the second group of rollers, wherein the second dispensing device is configured to treat items located on the top surface of the bed as the items are transported thereunder.

15. The conveyor system of claim 14, wherein the rotation of each of the first group of rollers adjacent to the items located on the top surface of the bed rotates the items in a direction opposite the rotation of the rollers of the first group as the items are transported under the first dispensing device.

16. The conveyor system of claim 15, wherein the rotation of each of the second group of rollers adjacent to items located on the top surface of the bed rotates the items in a direction opposite the rotation of the rollers of the second group as the items are transported under the second dispensing device.

17. The conveyor system of claim 14, wherein the first dispensing device is configured to spray liquid droplets onto the items as the items are transported thereunder.

18. The conveyor system of claim 17, wherein second dispensing device is configured to blow gas on the items as the items are transported thereunder to at least partially dry the items.

19. The conveyor system of claim 12, further comprising a control unit operatively coupled to the first rotation inducing device and the second rotation inducing device, wherein the control unit is configured to control a rotational rate of each roller in the first group and a rotational rate of each roller in the second group.

20. The conveyor system of claim 12, wherein the first instantaneous speed is at least two times greater than the first translational speed and the second instantaneous speed is at least two times greater than the second translational speed.

\* \* \* \* \*